United States Patent
Neri et al.

(10) Patent No.: US 11,635,573 B2
(45) Date of Patent: Apr. 25, 2023

(54) ADAPTER HOLDER ASSEMBLY

(71) Applicant: CommScope Technologies LLC, Hickory, NC (US)

(72) Inventors: Genaro Neri, Juarez (MX); Scott O. Charles, Hickory, NC (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 39 days.

(21) Appl. No.: 17/185,069

(22) Filed: Feb. 25, 2021

(65) Prior Publication Data

US 2021/0271028 A1 Sep. 2, 2021

Related U.S. Application Data

(60) Provisional application No. 62/983,224, filed on Feb. 28, 2020.

(51) Int. Cl.
*G02B 6/38* (2006.01)
(52) U.S. Cl.
CPC ......... *G02B 6/3825* (2013.01); *G02B 6/3897* (2013.01)

(58) Field of Classification Search
None
See application file for complete search history.

(56) References Cited

U.S. PATENT DOCUMENTS

| | | | |
|---|---|---|---|
| 9,069,150 B2 | 6/2015 | Solheid et al. | |
| 9,075,203 B2 | 7/2015 | Holmberg | |
| 9,429,714 B2 | 8/2016 | Holmberg | |
| 9,784,923 B2 | 10/2017 | Holmberg | |
| 10,247,887 B2 | 4/2019 | Holmberg | |
| 10,884,194 B2 | 1/2021 | Holmberg | |
| 2022/0229254 A1* | 7/2022 | Sievers | G02B 6/3825 |

* cited by examiner

*Primary Examiner* — Omar R Rojas
(74) *Attorney, Agent, or Firm* — Merchant & Gould P.C.

(57) ABSTRACT

An adapter holder assembly supports one or more optical adapters. The adapter holder includes first and second holding members spaced from each other. Inner sides of the holding members define one or more mounting channels each having a corresponding latching arm. The optical adapters mount to the holder assembly by sliding over the latching arms towards stop surfaces defined by the holding members. In certain implementations, the optical adapter is releasable by applying sufficient force to the optical adapter along a slide axis away from the respective stop surface.

27 Claims, 14 Drawing Sheets

FIG. 16

ADAPTER HOLDER ASSEMBLY

CROSS REFERENCE TO RELATED APPLICATION

This application claims the benefit of U.S. Provisional Application No. 62/983,224, filed Feb. 28, 2020, and titled "Adapter Holder Assembly," the disclosure of which is hereby incorporated herein by reference.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Optical fiber connectors and fiber optic enclosures are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic enclosures are incorporated into fiber optic networks to facilitate providing access to optical fibers of fiber optic network cables. Fiber optic enclosures often house components such as splice trays, passive optical splitters, fiber optic adapters, fiber optic connectors, connector storage regions, and other components.

Further development in such fiber termination systems is desired.

SUMMARY

Some aspects of the disclosure are directed to an adapter holder assembly that receives one or more optical adapters (e.g., optical adapter blocks). The adapter holder assembly includes first and second holding members. Each optical adapter includes a first mounting member that engages the first holding member and a second mounting member that engages the second holding member. In certain examples, the optical adapters include adapter blocks that define rows of ports extending between the holding members.

In certain implementations, the holding members each define a channel to receive the optical adapter (e.g., to receive the mounting member of the optical adapter). In certain implementations, the mounting members of the optical adapter snap-fit to the respective holding members. In some implementations, the optical adapter is releasable from the holding members by applying a sufficient sliding force to the optical adapter towards the open ends of the channels. In other implementations, the holding members may include release members for each channel.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an adapter holder assembly 100 configured to support one or more optical adapters. Each optical adapter defines at least one pair of ports facing in opposite directions and aligned with each other along an insertion axis I. In certain implementations, each optical adapter includes an optical adapter block 116 that defines multiple pairs of oppositely facing ports 160. The adapter holder assembly 100 includes a plurality of holding members 114. Each holding member 114 is configured to retain a respective end of the one or more adapter blocks 116.

Figure 2:
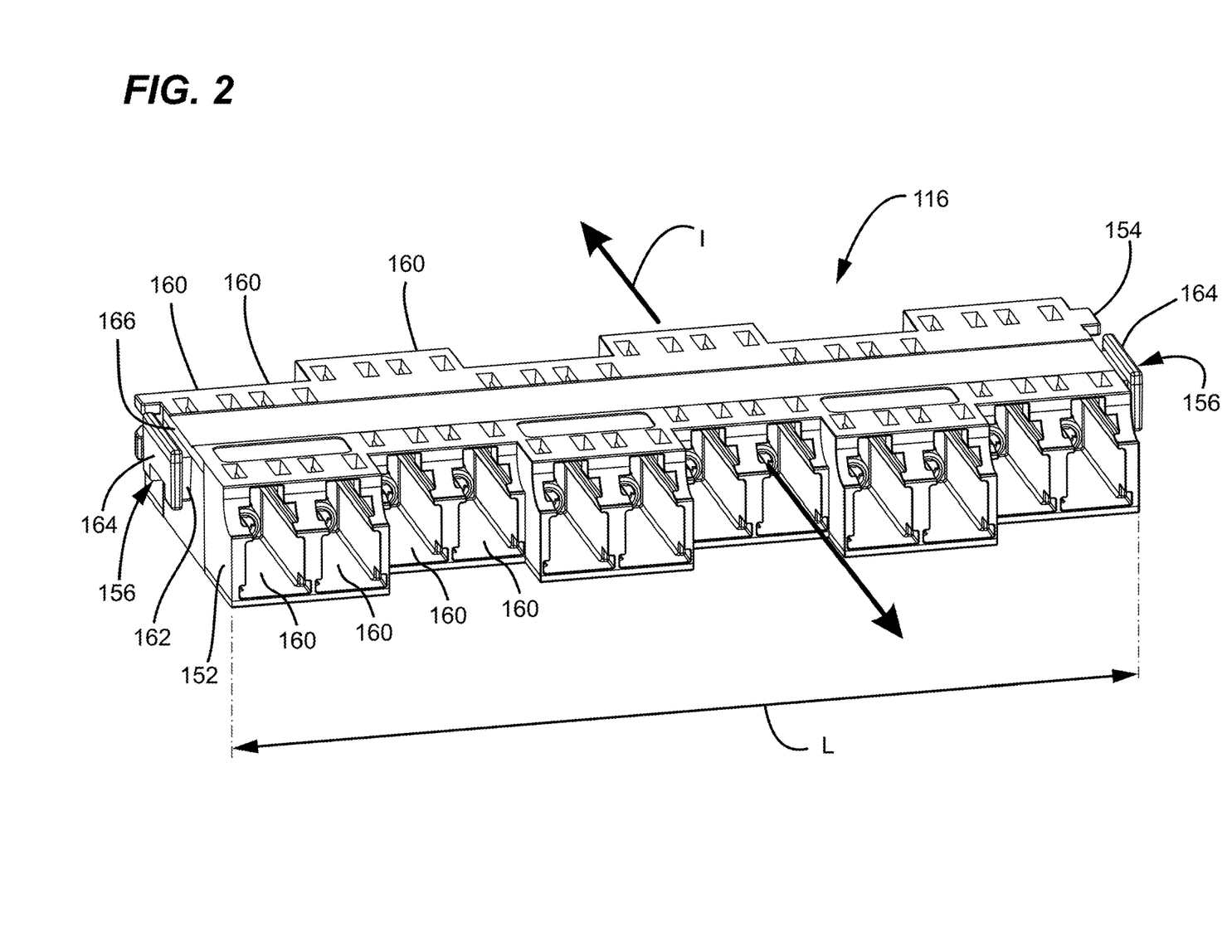
FIG. 2 is a perspective view of an example adapter block including mounting members at opposite ends of the adapter block.
Figure 3:
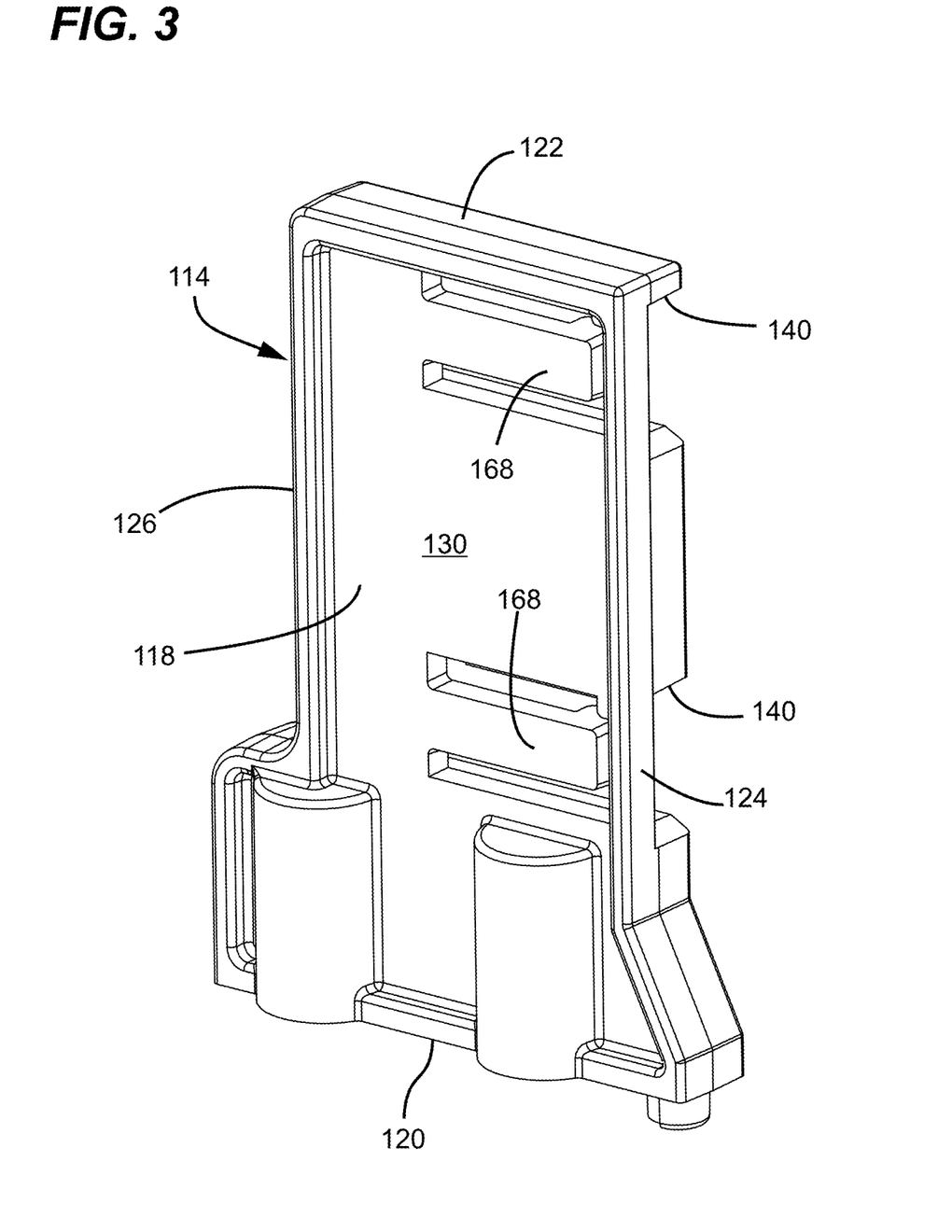
FIG. 3 is a perspective view of an outer side of an example holding member suitable for use with the adapter holder assembly of FIG. 1.

An example adapter block 116 is shown in FIG. 2. The adapter block 116 extends along a length L from a first end 152 to a second end 154. The adapter block 116 defines a first set of ports 160 facing in a first direction 102 and a second set of ports 160 facing in a second direction 104 opposite the first direction. Each port 160 in the first set aligns with one of the ports 160 in the second set along an insertion axis I.

A mounting arrangement is disposed at each of the first and second ends 152, 154 of the adapter block 116. In certain implementations, the mounting arrangement includes a mounting member 156. The mounting member 156 includes a spacer 162 extending outwardly from the respective end 152, 154 of the adapter block 116 along a direction parallel with the length L of the adapter block 116. A tab 164 extends laterally outwardly from the spacer 162 so that the tab 164 extends parallel with the insertion axis I. The spacer 162 forms define a groove 166 between the tab 164 and the respective end 152, 154 of the adapter block 116. In certain examples, the mounting arrangement also includes a ramp and shoulder structure 158 spaced from the mounting member 156 in a direction parallel to the insertion axis I.

Referring back to FIG. 1, the adapter holder assembly 100 holds two optical adapter blocks 116 in a vertical stack. In other implementations, the adapter holder assembly 100 can hold greater or fewer optical adapter blocks 116. In certain implementations, the holder assembly 100 holds the adapter blocks 116 vertically spaced from each other along a gap G. The holder assembly 100 positions the adapter blocks 116 so that the gap G is sized to accommodate latches of the plug connectors received in the bottom adapter block 116.

Figure 1:
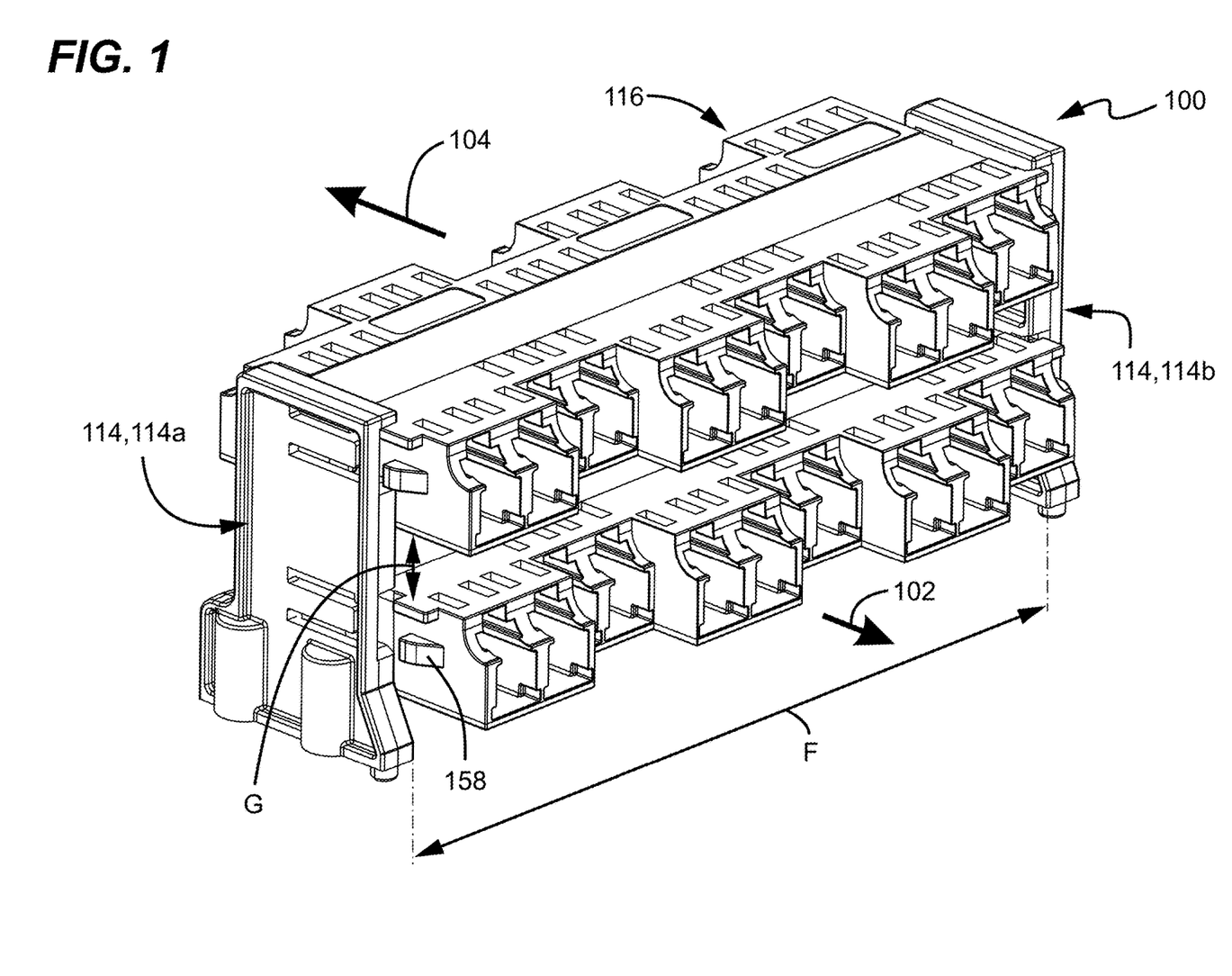
FIG. 1 is perspective view of an example adapter holder assembly suitable for holding one more optical adapters (e.g., one or more optical adapter blocks), the holder assembly including first and second holding members configured in accordance with the principles of the present disclosure.

The adapter holder assembly 100 includes a first holding member 114a and a second holding member 114b spaced from each other along an axis F (FIG. 1). The first and second holding members 114a, 114b are generally spaced from each other by the length of the optical adapter(s) being held. In certain examples, the first and second holding members 114a, 114b are separately positionable from each other. In some implementations, the first and second holding members 114a, 114b can be mounted to the one or more adapter packs 116 and then mounted as a unit at an installation site (e.g., a wall, panel, or other surface). In other implementations, the first and second holding member 114a, 114b can be mounted at the installation site in fixed positions and then receive the one or more adapter blocks 116.

The first holding member 114a is configured to engage the mounting member 156 at the first end 152 of the adapter block 116 and the second holding member 114b is configured to engage the mounting member 156 at the second end 154 of the adapter block 116. In certain examples, each holding member 114, 114a, 114b snap-fits to engage the respective mounting member 156. In certain examples, the first and second holding members 114a, 114b are substantially similar except that they face in opposing directions. For the sake of convenience, overlapping details of the holding members 114a, 114b will be described herein with reference to a holding member 114 shown in FIGS. 3-7.

Each holding member 114 includes a body 118 having a height H (FIG. 7) extending between opposite first and second ends 120, 122, a width W (FIG. 6) extending between opposite first and second sides 124, 126, and a depth D (FIG. 7) extending between opposite inner and outer sides 128, 130. The inner sides 128 of each holding member 114, 114a, 114b face each other when disposed in an adapter holding assembly 100 to receive an optical adapter. The outer sides 130 face away from each other when disposed in the adapter holder assembly 100.

In certain implementations, the holding member body 118 includes a mounting structure 132 at the first end 120. The holding member 114 is secured to an installation site using the mounting structure 132. In certain implementations, the mounting structure 132 includes one or more fastener openings 134. In certain examples, the body 118 defines fastener receptacles 138 accessible through the fastener openings 134. In certain implementations, the mounting structure 132 includes an alignment structure (e.g., an alignment peg) 136 that mates with an alignment structure (e.g., an alignment hole) at the installation site.

The body 118 of each holding member 114 defines at least one mounting channel 140 extending along the width W of the body 121 at the inner side 128. In certain implementations, the body 118 defines a plurality of mounting channels 140. In certain examples, each holding member 114 in an adapter holder assembly 100 has a common number of mounting channels 140. Each mounting channel 140 of a first of the holding members 114a aligns with a corresponding mounting channel of a second of the holding members 114b.

Figure 12:
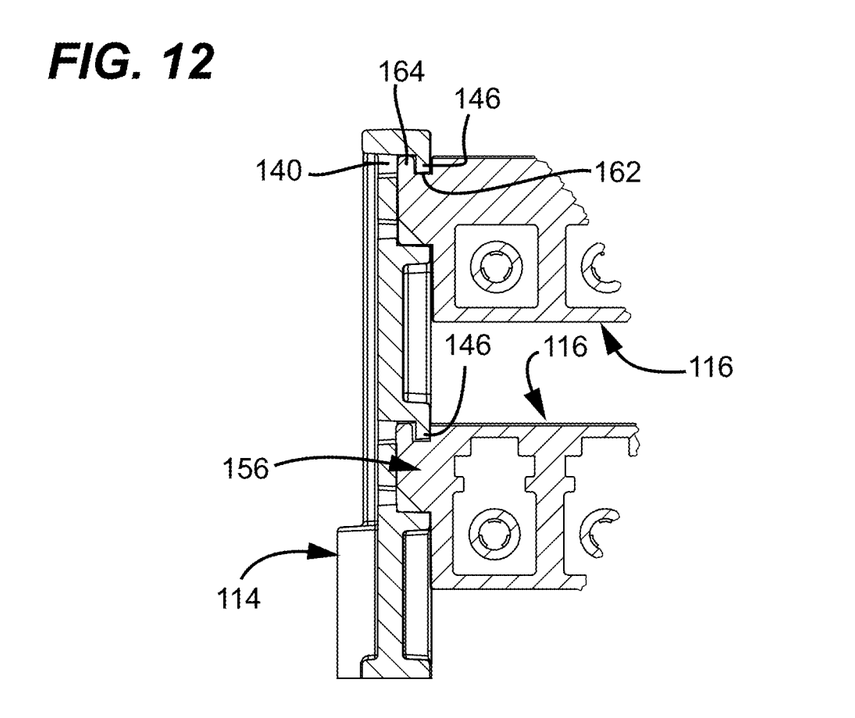
FIG. 12 is an enlarged view of a portion of FIG. 11.

In certain implementations, each mounting channel 140 extends from an open end 142 to a closed end 144. In certain examples, the closed end 144 defines a stop surface against which the optical adapter 116 may abut to inhibit continued movement of the optical adapter 116 relative to the holding member 114 as will be described in more detail herein. In certain implementations, the body 118 includes an overhang portion 146 that extends over a portion of the mounting channel 140. In certain examples, the overhang portion 146 extends into the groove 166 above the spacer 162 of the mounting member 156 (e.g., see FIG. 12). In certain examples, the overhang portion 146 (FIG. 7) is disposed closer to the open end 142 than to the closed end 144. In certain examples, the overhang portion 146 is offset inwardly from the open end 142.

Figure 6:
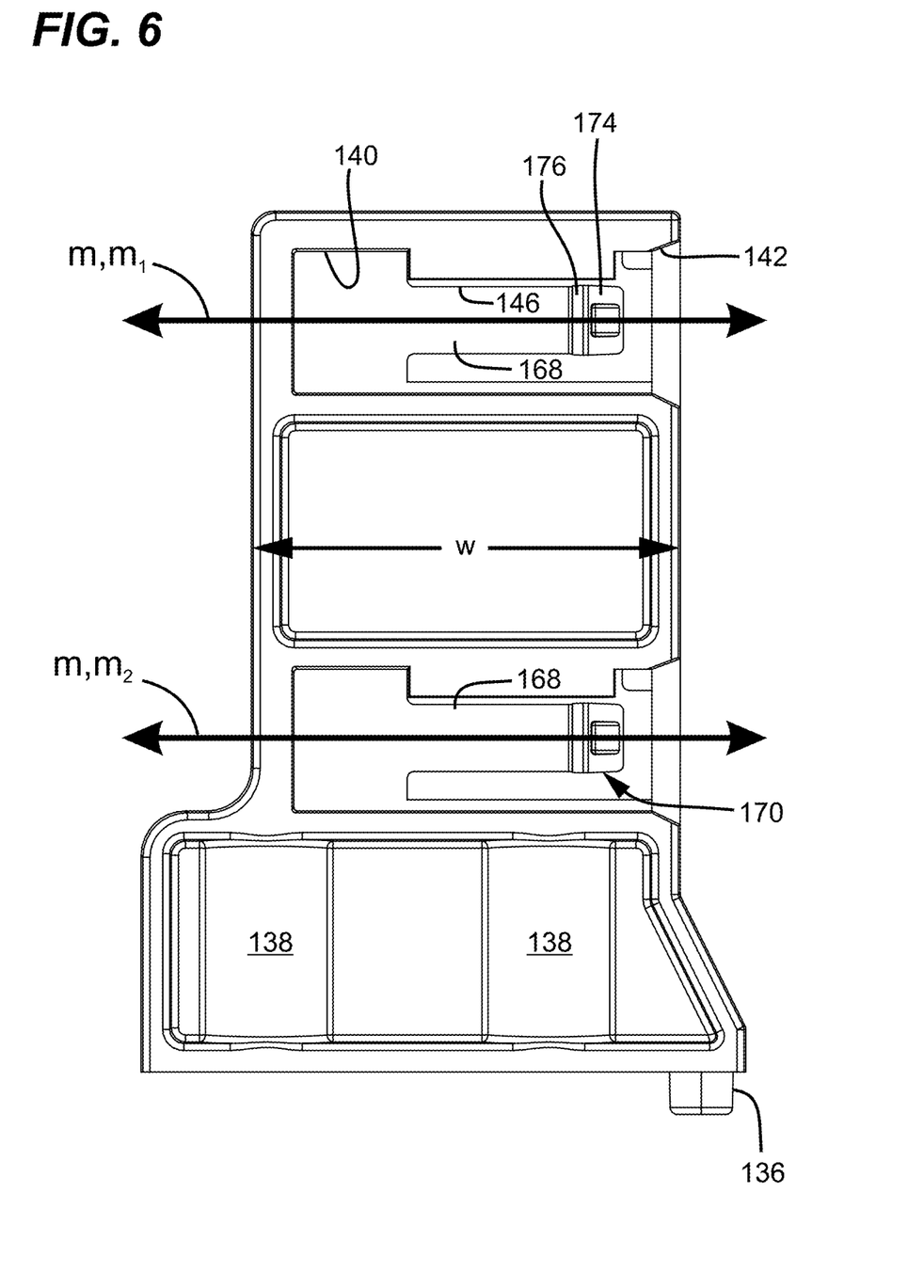
FIG. 6 is a side view of the holding member of FIG. 4.
Figure 7:
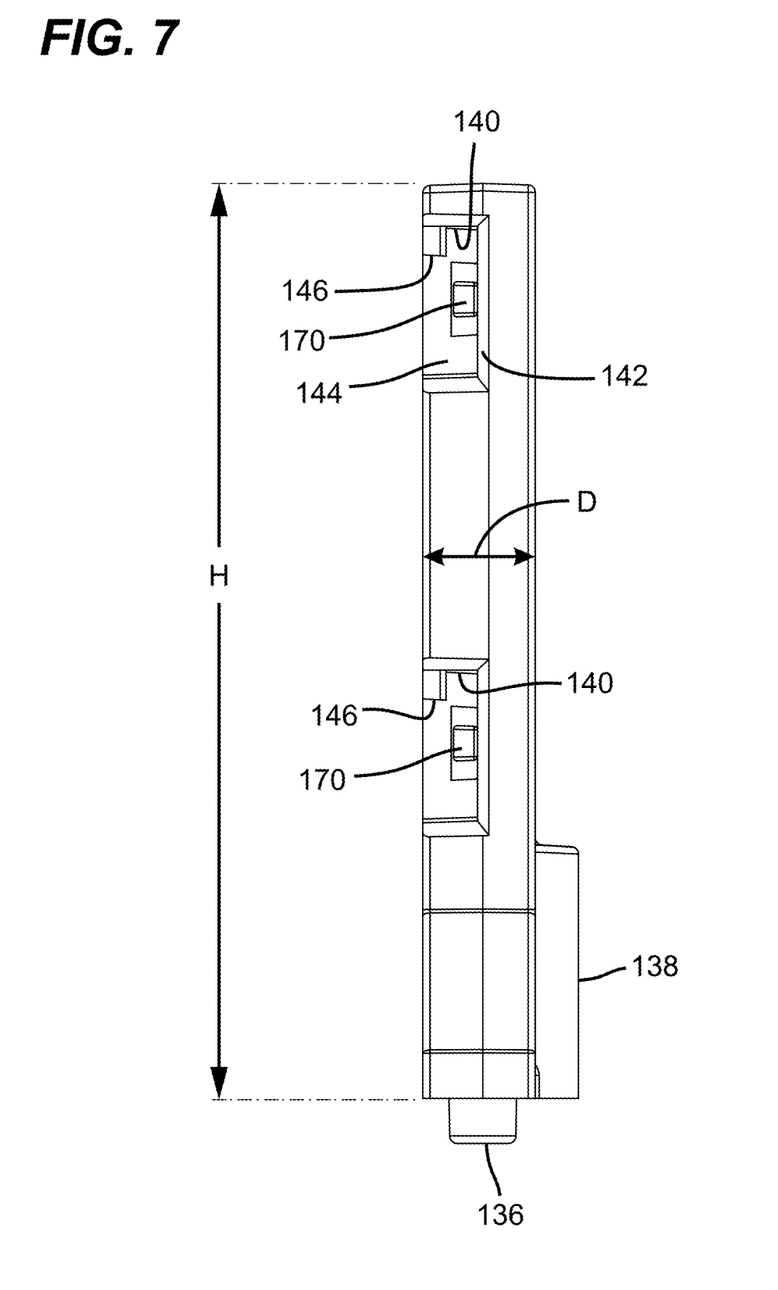
FIG. 7 is an end view of the holding member of FIG. 4.
Figure 8:
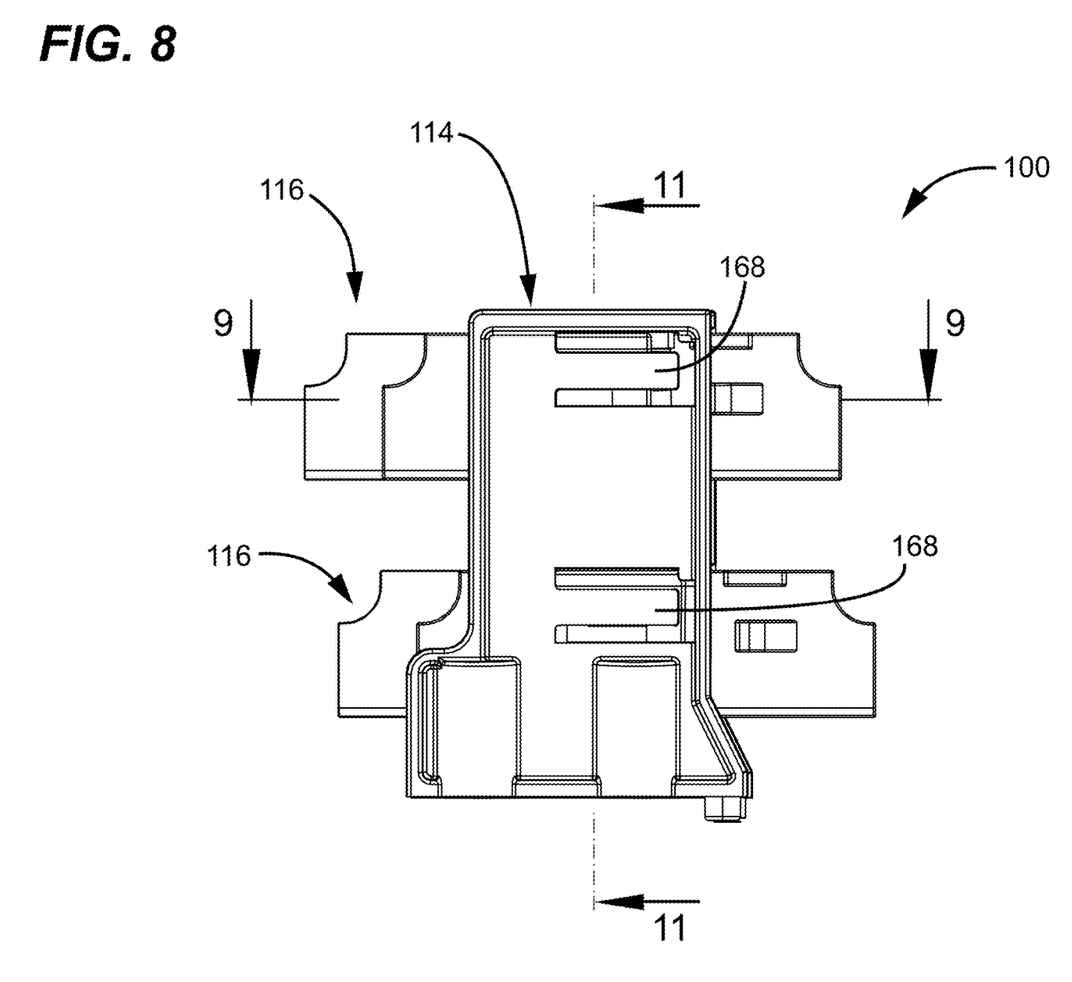
FIG. 8 is a side elevational view of the adapter holder assembly of FIG. 1.
Figure 9:
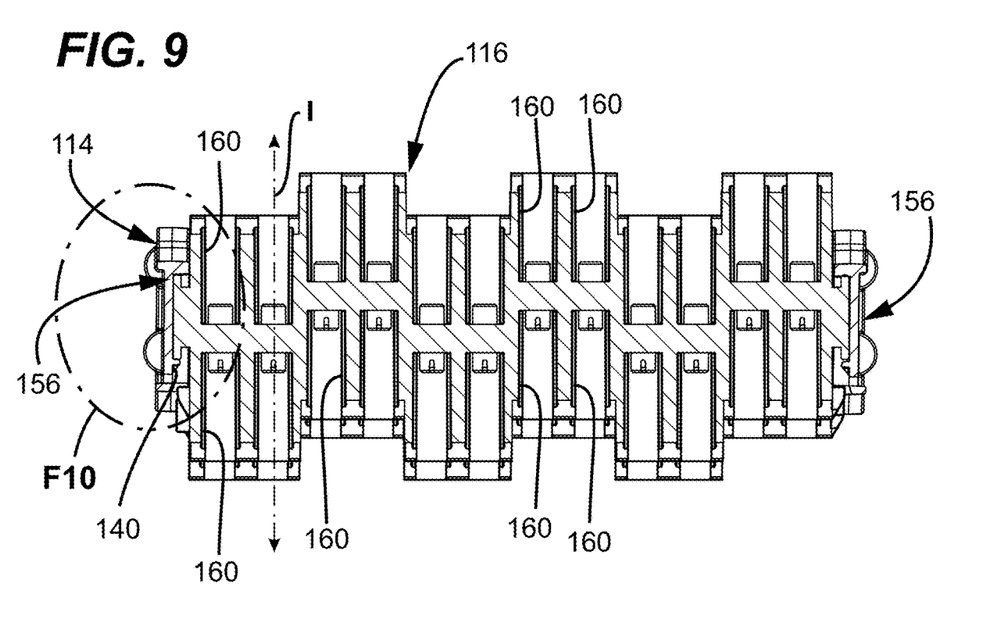
FIG. 9 is a cross-sectional view taken along the 9-9 line of FIG. 8.

In certain implementations, a mounting member 156 of the optical adapter 116 is configured to slide into a respective mounting channel 140 of the holding member 114. The mounting member 156 moves through the open end 142 of the mounting channel 140 along a slide path M (FIG. 6). In certain examples, the mounting member 156 slides through the channel 140 until the tab 164 abuts the closed end (i.e., the stop surface) 144.

Figure 10:
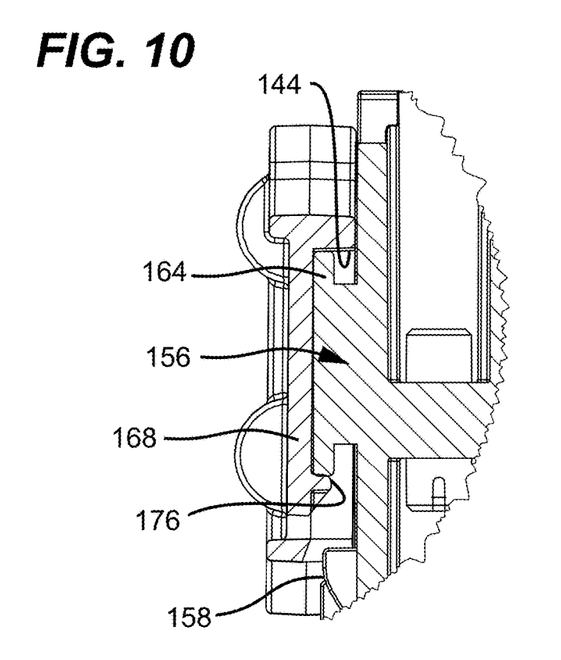
FIG. 10 is an enlarged view of a portion of FIG. 9.
Figure 11:
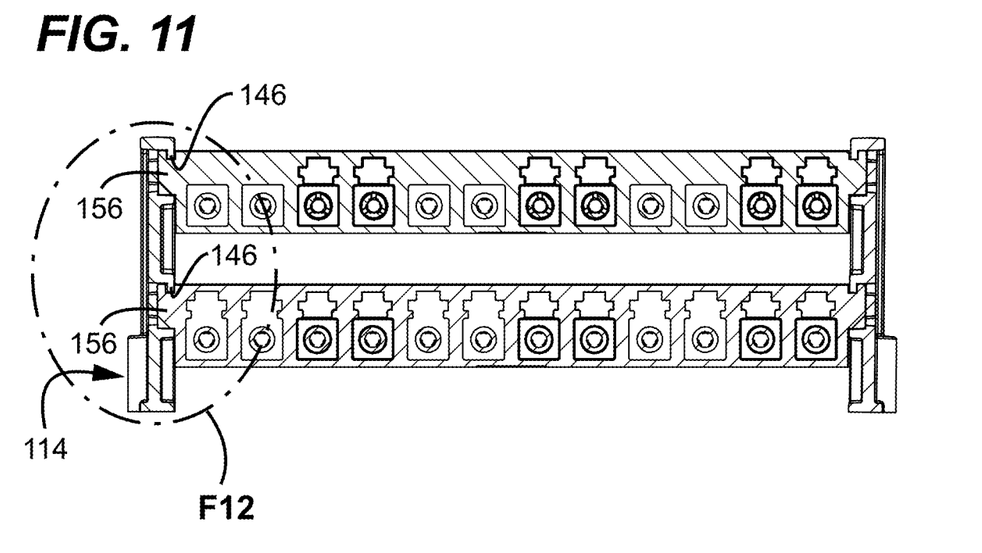
FIG. 11 is a cross-sectional view taken along the 11-11 line of FIG. 8.

In certain implementations, each holding member 114 includes a latch arm 168 extending along the mounting channel 140. The latch arm 168 is outwardly deflectable relative to the channel 140 (e.g., relative to the overhang portion 146 of the channel 140). The latch arm 168 including a latching hook 170 that snaps over the mounting member 156 when the mounting member 156 is received in the mounting channel 140 (e.g., see FIG. 10).

Figure 4:
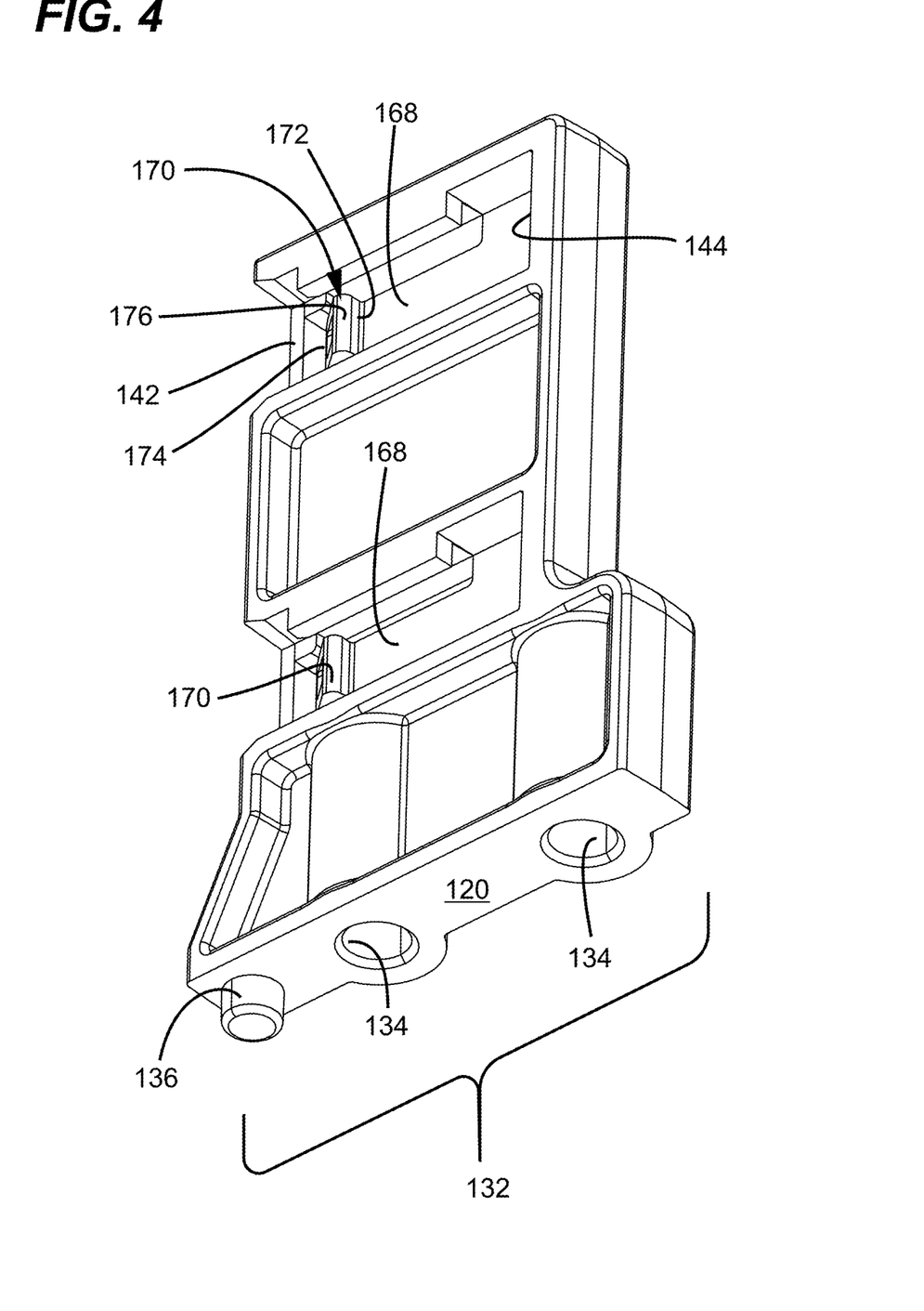
FIG. 4 is a bottom perspective view of an inner side of the holding member of FIG. 3.
Figure 5:
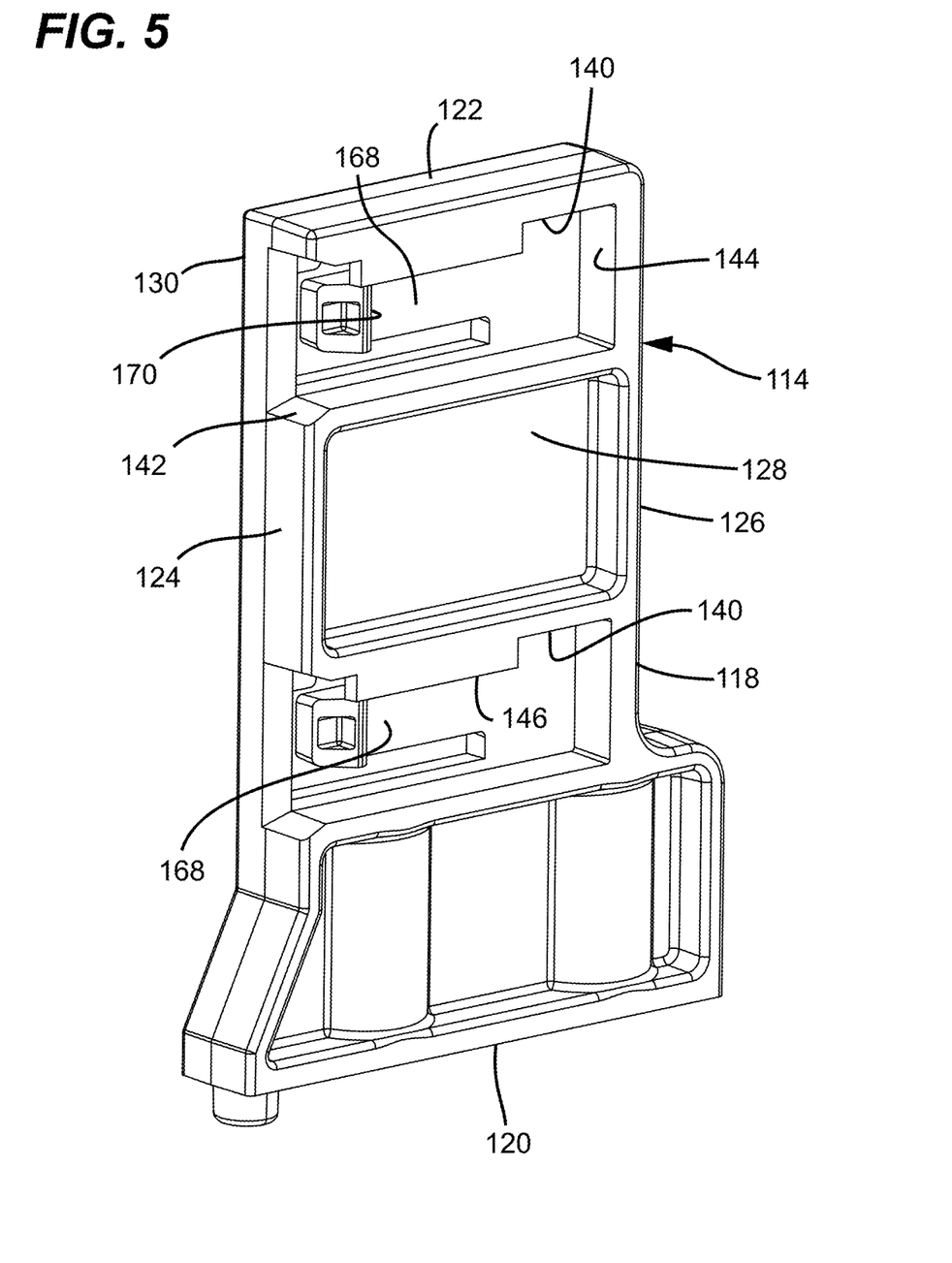
FIG. 5 is a top perspective view of the holding member of FIG. 4.

As shown in FIG. 4, the latching hook 170 has an abutment surface 172 and a camming surface 174. The abutment surface 172 faces towards the respective stop surface 144 and contacts the tab 164 of the mounting member 156. The latching hook 170 deflects outwardly as the mounting member 156 (e.g., the tab 164 of the mounting members 156) slides over the camming surface 174 in a first direction towards the closed end 144 of the mounting channel 140. The resilience of the latch arm 168 snaps the latching hook 170 back over the mounting member 156 when the mounting member 156 clears the latching hook 170.

In some implementations, a transition surface 176 extends between the abutment surface 172 and the camming surface 174 (e.g., FIG. 4). In certain examples, the transition surface 176 is contoured to facilitate outward deflection of the latching hook 170 when sufficient force is applied in a second direction away from the closed end 144 of the mounting channel 140. Accordingly, the adapter block 116 can be removed from the holding member 114 by sliding the adapter block 116 along the slide path M in an opposite direction from when the adapter block 116 was loaded. Instead of requiring a user to release the mounting member 156 from the latching hook 170 by pulling the latch arm directly or with tools, the user instead only applies a sufficient force to the latching block 116 in the second direction along the slide path M to release the latching block 116.

Figure 15:
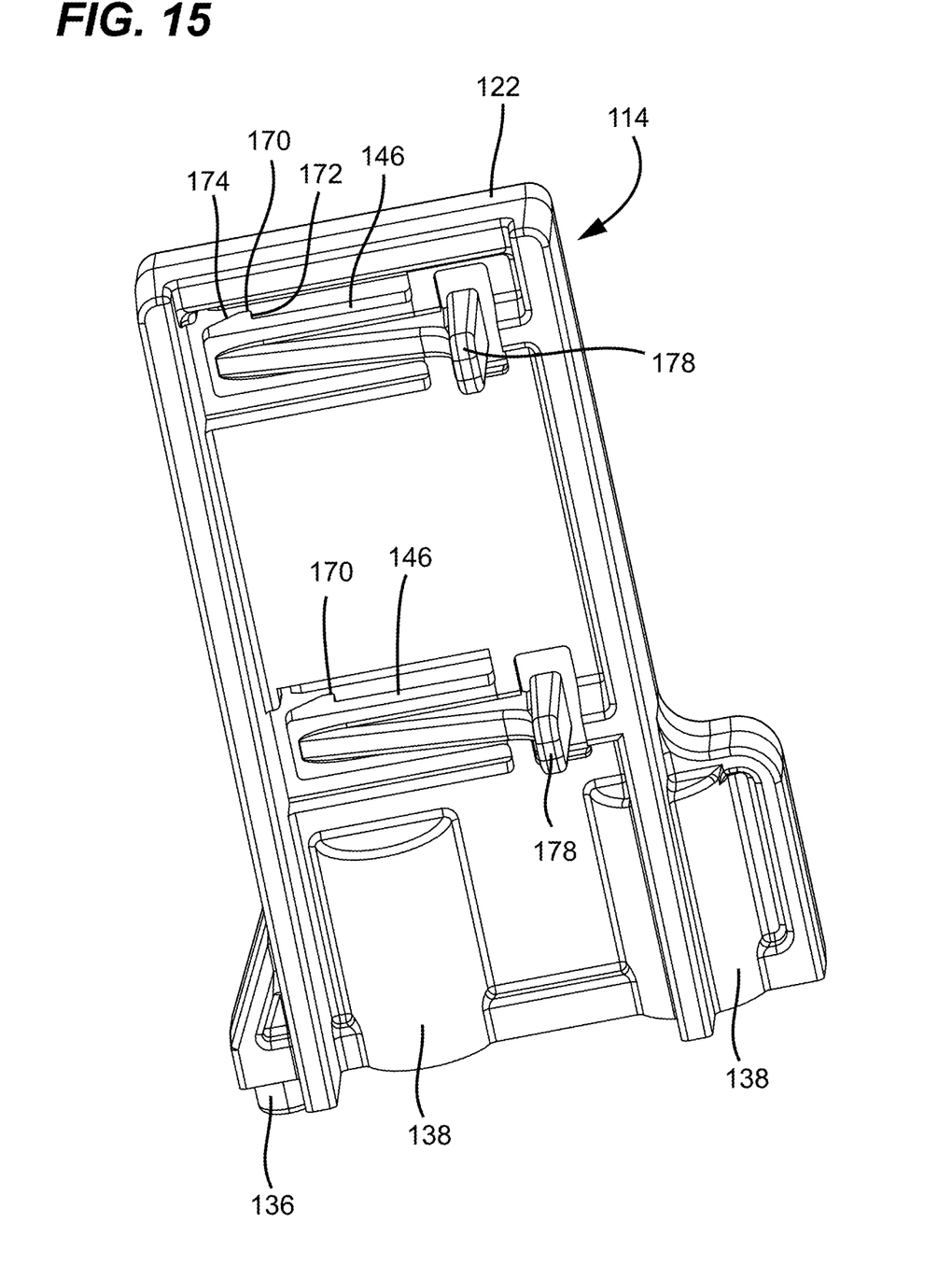
FIG. 15 is a top perspective view of an outer side of another example holding member suitable for use with the adapter holder assembly of FIG. 1.
Figure 16:
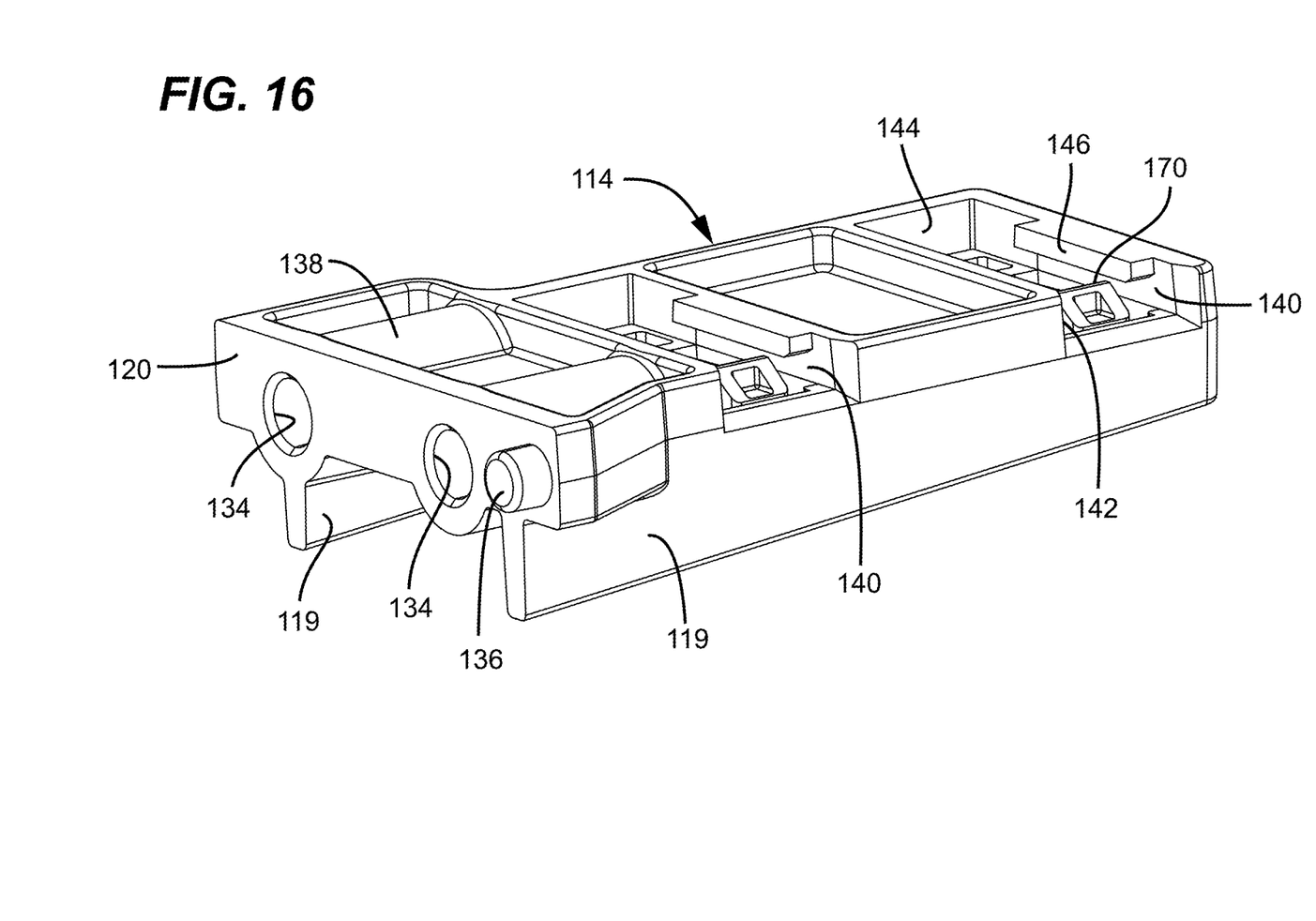
FIG. 16 is a bottom perspective view of an inner side of the holding member of FIG. 15.

In other implementations, the catch surface 172 and the camming surface 174 meet at an angle (e.g., a 90 degree angle). In certain such implementations, the latching hook 170 is releasable from the mounting member 156 using a release member 178 (e.g., see FIG. 15). In certain examples, the release member 178 cooperates with the latch arm 168 to form a right angle lever. Applying pressure to the release member 178 deflects the latching hook 170 outwardly from the mounting channel 140. Accordingly, pressing on the release member 178 unlatches the optical adapter 116, thereby allowing the optical adapter 116 to slide out of the channel 140.

In certain implementations, the holding member 114 defines a plurality of mounting channels 140. Each mounting channel 140 has a corresponding latch arm 168. In an adapter holder assembly 100, each holding member 114 has a common number of channels 140 and latch arms 168 that align with each other along the first axis F. Accordingly, two holding members 114 in the holder assembly 100 cooperate to hold one or more adapter blocks 116 therebetween. The mounting channels 140 are spaced from each other along the height of the holding member 114. According, the adapter blocks 116 are spaced from each other along the height of the holding members 114. In certain examples, the adapter blocks 116 are sufficiently spaced to accommodate latches of plug connectors received at the ports 160 of the lower-mounted (e.g., bottom) adapter blocks 116.

Figure 13:
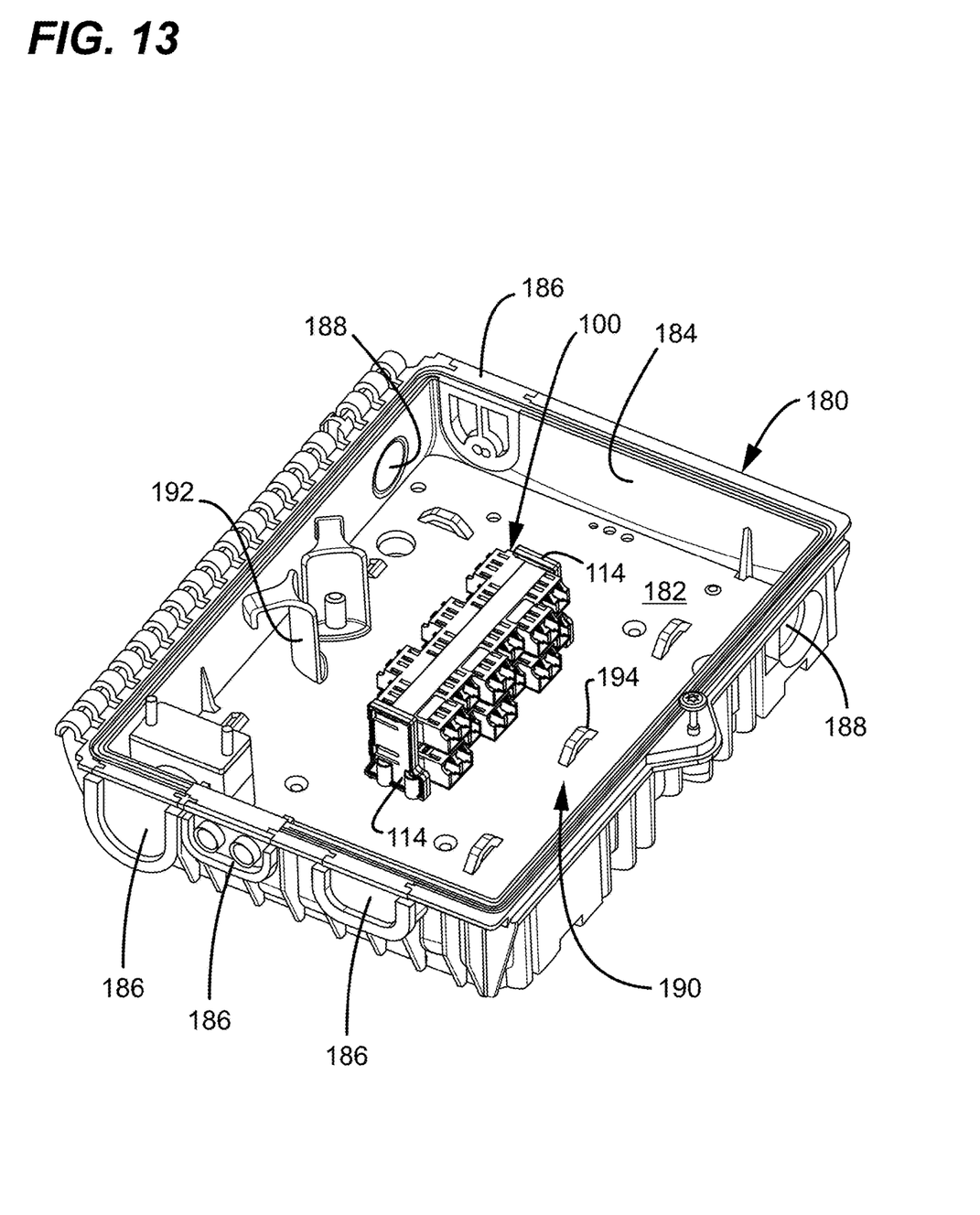
FIG. 13 is a perspective view of an example enclosure having the adapter holder assembly of FIG. 1 disposed therein.
Figure 14:
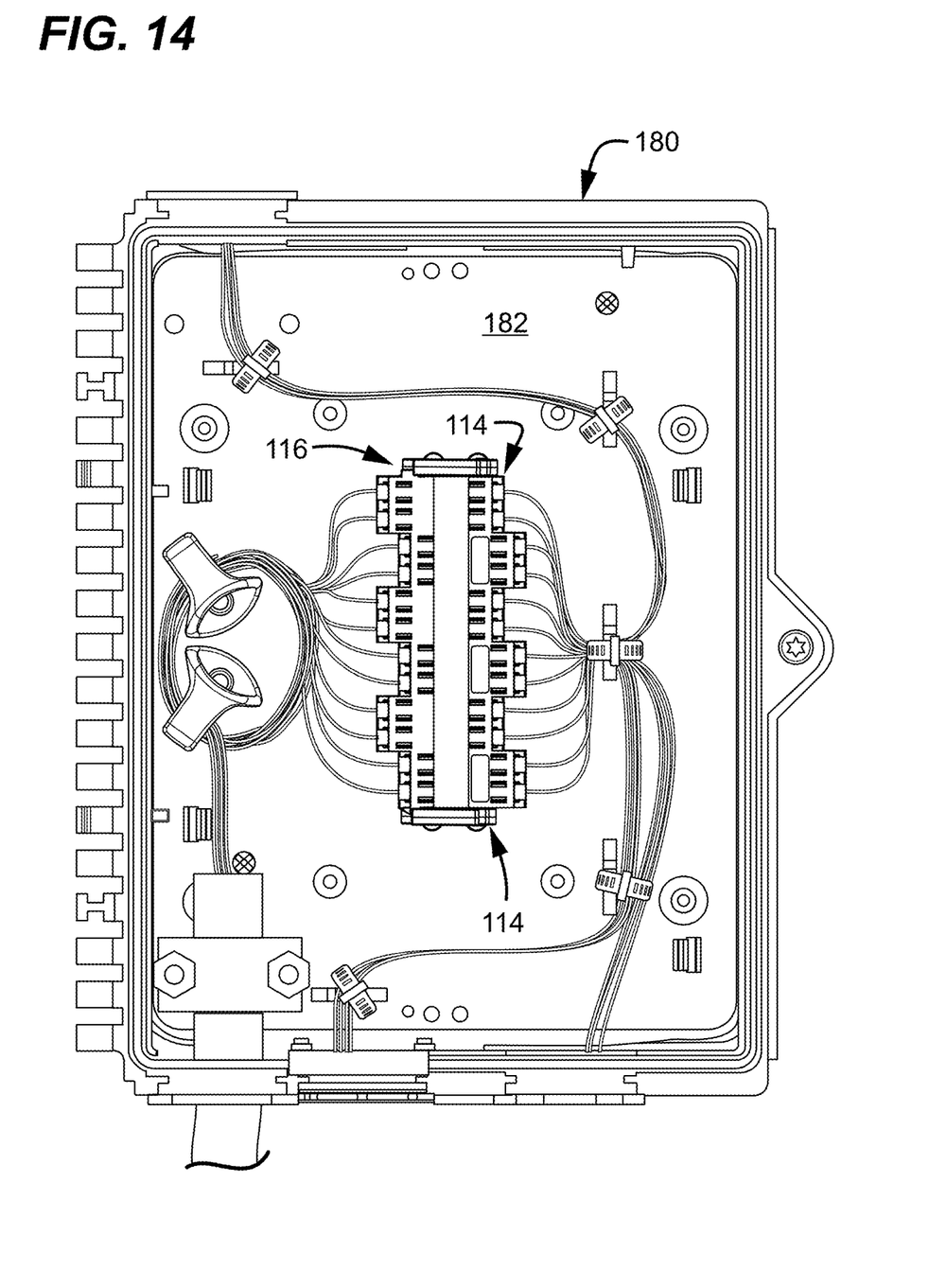
FIG. 14 is a top plan view of the enclosure of FIG. 13 with example cabling added therein.

FIGS. 13-14 show the adapter holder assembly 100 in an example environment. In the example shown, the adapter holder assembly 100 is disposed within a sealed enclosure 180. The enclosure 180 includes a base 182 from which a peripheral sidewall 184 extends upwardly. A cover (not shown) can be mounted to the sidewall 184 to close the enclosure 180. The adapter holder assembly 100 is mounted to the base 182 using the mounting structure 132. For example, fastener may be inserted through the base 182 and into the fastener openings 134.

One or more adapter blocks 116 may be mounted to the adapter holder assembly 100. In the example shown, two adapter blocks 116 are mounted to the holder assembly 100. In other examples, the holding members 114 can be configured to receive additional adapter blocks 116.

The enclosure 180 includes one or more cable ports 186 through which optical cables access the interior of the enclosure 180. In certain implementations, the one or more cable ports 186 are defined in the sidewall 184. Gaskets or other seals may be disposed at the ports 186. One or more of the cable ports 186 may be covered using a knock-out piece 188 to seal the enclosure interior until the port 186 is needed. In some examples, the cable ports 186 include glands that allow a cable to extend into the housing. In other examples, the cable ports 186 include connection interfaces (e.g., optical adapters) at which external cables can be connected to internal cabling.

One or more cable management structures 190 can be disposed within the enclosure 180 to guide cables and/or optical fibers to and from the optical adapters 116. Example cable management structures 190 include one or more bend radius limiters 192 (e.g., positioned to form a cable spool) and one or more support members 194 for cable ties. The cable management structures 190 guide optical fibers from the cable ports 186 to the optical adapters 116.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An adapter holder assembly for use in supporting an optical adapter, the adapter holder assembly comprising:
   first and second holding members each having a height extending between first and second ends and a width extending between opposite sides, each of the first and second holding members having an inner side facing the inner side of the other of the second and first holding members, the inner sides being spaced from each other over a distance along a first axis, the inner side of each of the first and second holding members defining a mounting channel extending along the width from one of the opposite sides towards the other of the opposite sides, the mounting channel of the first holding member being aligned with the mounting channel of the second holding member along the first axis, each of the first and second holding members including a stop surface disposed at the other of the opposite sides and accessible from the mounting channel, each of the first and second holding members including a latch arm extending along the respective mounting channel and being outwardly deflectable, each of the latch arms including a latching hook that faces towards the respective stop surface;
   wherein the mounting channel of each of the first and second holding members is one of a plurality of mounting channels spaced from each other along the height of the respective one of the first and second holding members, and wherein each of the mounting channels includes a corresponding latching arm.

2. The adapter holding assembly of claim 1, wherein the latching hook includes a camming surface and a catch surface, and wherein the catch surface is contoured to facilitate outward deflection when sufficient force is applied to the catch surface.

3. The adapter holding assembly of claim 1, wherein the first end of each of the first and second holding members defines a mounting structure for securement to an installation site.

4. The adapter holding assembly of claim 3, wherein the mounting structure includes a fastener opening.

5. The adapter holding assembly of claim 4, wherein the mounting structure includes a fastener receptacle extending from the fastener opening.

6. The adapter holding assembly of claim 3, wherein the mounting structure includes an alignment peg extending outwardly from the first end.

7. The adapter holding assembly of claim 1, further comprising an optical adapter extending along a length between opposite first and second ends, the optical adapter defining at least a first port and at least a second port facing in opposite directions from each other along an insertion axis, the insertion axis being transverse to the length, the optical adapter including a first mounting member at the first end and a second mounting member at the second end, the first mounting member being disposed within the mounting channel of the first holding member, the second mounting member being disposed within the mounting channel of the second holding member.

8. The adapter holding assembly of claim 7, wherein the first mounting member engages the latch arm of the first holding member and the second mounting member engages the latch arm of the second holding member.

9. The adapter holding assembly of claim 8, wherein the mounting members each include a tab extending laterally outwardly from a spacer.

10. The adapter holding assembly of claim 7, wherein the optical adapter includes an optical adapter block, wherein the first port is one of a plurality of first ports and the second port is one of a plurality of second ports, each of the second ports being aligned along a respective insertion axis with one of the first ports.

11. The adapter holding assembly of claim 1, further comprising a plurality of optical adapters mounted to the first and second holding members, each of the optical adapters having a first mounting member disposed at a first end and a second mounting member disposed at a second end, wherein the first mounting member of each optical adapter is disposed in one of the mounting channels of the first holding member and the second mounting member of each optical adapter is disposed in one of the mounting channels of the second holding member.

12. The adapter holding assembly of claim 11, wherein the mounting channels of the first and second holding members are spaced along the height to space adjacent ones of the optical adapters from each other along the height of the first and second holding members.

13. The adapter holding assembly of claim 1, wherein each of the mounting channels is partially defined by an overhang section of the respective one of the first and second holding members.

14. A method for mounting an optical adapter block to an adapter holding assembly, the optical adapter block including a row of first ports extending between opposite first and second ends, the first ports having parallel insertion axes, the method comprising:
   aligning a first mounting member of a first optical adapter block with an open end of a mounting channel at a first holding member;
   aligning a second mounting member of the first optical adapter block with an open end of a mounting channel at a second holding member; and
   sliding the first optical adapter block relative to the first and second holding members along a mounting axis to deflect latching arms of the first and second holding members until the latching arms snap over the first and second mounting members, the mounting axis being parallel to the insertion axes of the first optical adapter block.

15. The method of claim 14, further comprising:
   aligning a first mounting member of a second optical adapter block with an open end of a second mounting channel at the first holding member;
   aligning a second mounting member of the second optical adapter block with an open end of a second mounting channel at a second holding member; and
   sliding the first optical adapter block relative to the first and second holding members along a mounting axis to deflect latching arms of the first and second holding members until the latching arms snap over the first and second mounting members, the mounting axis being parallel to the insertion axes of the first optical adapter block.

16. The method of claim 14, further comprising securing the first and second mounting members to an installation site.

17. The method of claim 16, wherein securing the first and second mounting members includes inserting fasteners through fastener openings of the first and second mounting members.

18. The method of claim 16, wherein securing the first and second mounting members includes inserting an alignment peg into a hole at the installation site.

19. A holding member comprising:
   a body extending along a height between first and second ends and along a width between first and second sides, the width being transverse to the height;
   a mounting arrangement disposed at the first end of the body;
   a mounting channel defined along the width of the body, the mounting channel having an open end at the first side of the body, the mounting channel having a closed end at the second side of the body;
   a latching arm coupled to the body and extending along the mounting channel, the latching arm including a latching hook defining a cam surface and a catch surface, the cam surface facing at least partially towards the open end of the mounting channel, the catch surface facing at least partially towards the closed end of the mounting channel, the latching hook being accessible within the mounting channel, the latching arm being deflectable to move the catch surface away from the inner side of the body; and
   an overhang portion extending from the body to partially cover the mounting channel so that the overhang portion extends across the latching hook.

20. The holding member of claim 19, wherein:
   the mounting channel is one of a plurality of mounting channels defined by the body, the mounting channels being spaced from each other along the height of the body;
   the overhang portion is one of a plurality of overhang portions that each partially cover one of the mounting channels, the overhang portions being aligned with each other along the height of the body; and
   the latching arm is one of a plurality of latching arms coupled to the body, each of the latching arms extending along one of the mounting channels, each latching arm including a respective latching hook defining a cam surface and a catch surface.

21. The holding member of claim 19, wherein the latching hook is contoured to facilitate deflection of the latching arm upon a sufficient force being applied to the catch surface.

22. The holding member of claim 19, wherein the mounting arrangement includes at least one fastener opening.

23. The holding member of claim 19, wherein the mounting arrangement includes at least one guide peg.

24. An adapter holder assembly for use in supporting an optical adapter, the adapter holder assembly comprising:
   first and second holding members each having a height extending between first and second ends and a width extending between opposite sides, each of the first and second holding members having an inner side facing the inner side of the other of the second and first holding members, the inner sides being spaced from each other over a distance along a first axis, the inner side of each of the first and second holding members defining a mounting channel extending along the width from one of the opposite sides towards the other of the opposite sides, the mounting channel of the first holding member being aligned with the mounting channel of the second holding member along the first axis, each of the first and second holding members including a stop surface disposed at the other of the opposite sides and accessible from the mounting channel, each of the first and second holding members including a latch arm extending along the respective mounting channel and being outwardly deflectable, each of the latch arms including a latching hook that faces towards the respective stop surface, wherein the first end of each of the first and second holding members defines a mounting structure for securement to an installation site, and wherein the mounting structure includes an alignment peg extending outwardly from the first end.

25. An adapter holder assembly for use in supporting an optical adapter, the adapter holder assembly comprising:

first and second holding members each having a height extending between first and second ends and a width extending between opposite sides, each of the first and second holding members having an inner side facing the inner side of the other of the second and first holding members, the inner sides being spaced from each other over a distance along a first axis, the inner side of each of the first and second holding members defining a mounting channel extending along the width from one of the opposite sides towards the other of the opposite sides, the mounting channel of the first holding member being aligned with the mounting channel of the second holding member along the first axis, each of the first and second holding members including a stop surface disposed at the other of the opposite sides and accessible from the mounting channel, each of the first and second holding members including a latch arm extending along the respective mounting channel and being outwardly deflectable, each of the latch arms including a latching hook that faces towards the respective stop surface;

an optical adapter extending along a length between opposite first and second ends, the optical adapter defining at least a first port and at least a second port facing in opposite directions from each other along an insertion axis, the insertion axis being transverse to the length, the optical adapter including a first mounting member at the first end and a second mounting member at the second end, the first mounting member being disposed within the mounting channel of the first holding member, the second mounting member being disposed within the mounting channel of the second holding member, wherein the first mounting member engages the latch arm of the first holding member and the second mounting member engages the latch arm of the second holding member, wherein the mounting members each include a tab extending laterally outwardly from a spacer.

26. An adapter holder assembly for use in supporting an optical adapter, the adapter holder assembly comprising:

first and second holding members each having a height extending between first and second ends and a width extending between opposite sides, each of the first and second holding members having an inner side facing the inner side of the other of the second and first holding members, the inner sides being spaced from each other over a distance along a first axis, the inner side of each of the first and second holding members defining a mounting channel extending along the width from one of the opposite sides towards the other of the opposite sides, the mounting channel of the first holding member being aligned with the mounting channel of the second holding member along the first axis, each of the first and second holding members including a stop surface disposed at the other of the opposite sides and accessible from the mounting channel, each of the first and second holding members including a latch arm extending along the respective mounting channel and being outwardly deflectable, each of the latch arms including a latching hook that faces towards the respective stop surface, wherein the mounting channel of each of the first and second holding members is one of a plurality of mounting channels, and wherein each of the mounting channels includes a corresponding latching arm; and a plurality of optical adapters mounted to the first and second holding members, each of the optical adapters having a first mounting member disposed at a first end and a second mounting member disposed at a second end, wherein the first mounting member of each optical adapter is disposed in one of the mounting channels of the first holding member and the second mounting member of each optical adapter is disposed in one of the mounting channels of the second holding member.

27. The adapter holding assembly of claim 26, wherein the mounting channels of the first and second holding members are spaced along the height to space adjacent ones of the optical adapters from each other along the height of the first and second holding members.

* * * * *